US012247537B2

(12) United States Patent
Mack et al.

(10) Patent No.: US 12,247,537 B2
(45) Date of Patent: Mar. 11, 2025

(54) AIR INTAKE SYSTEM FOR POWER MACHINES

(71) Applicant: Doosan Bobcat North America, Inc., West Fargo, ND (US)

(72) Inventors: Talon Mack, New Salem, ND (US); Christopher J. Babcock, Honolulu, HI (US); Brandon J. Kisse, Bismarck, ND (US); Ryan Eberhardt, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 14 days.

(21) Appl. No.: 18/240,928

(22) Filed: Aug. 31, 2023

(65) Prior Publication Data

US 2024/0068431 A1 Feb. 29, 2024

Related U.S. Application Data

(60) Provisional application No. 63/402,654, filed on Aug. 31, 2022.

(51) Int. Cl.
| | | |
|---|---|---|
| *F02M 35/16* | (2006.01) | |
| *B60K 11/06* | (2006.01) | |
| *B60K 13/02* | (2006.01) | |
| *B62D 25/08* | (2006.01) | |
| *F02M 35/10* | (2006.01) | |

(52) U.S. Cl.
CPC ........... *F02M 35/164* (2013.01); *B60K 11/06* (2013.01); *B60K 13/02* (2013.01); *B62D 25/082* (2013.01); *F02M 35/10144* (2013.01)

(58) Field of Classification Search
CPC ........... F02M 35/164; F02M 35/10144; B60K 11/06; B60K 13/02; B62D 25/082
See application file for complete search history.

(56) References Cited

U.S. PATENT DOCUMENTS

| | | | |
|---|---|---|---|
| 6,257,359 B1 | 7/2001 | Granlund et al. | |
| 8,573,342 B2 * | 11/2013 | Juptner | F01P 11/12 180/68.1 |

(Continued)

FOREIGN PATENT DOCUMENTS

EP    1741894 A1    1/2007

OTHER PUBLICATIONS

International Searching Authority, International Search Report and Written Opinion issued for the corresponding International Application No. PCT/US2023/073215, dated Jan. 9, 2024 [9 pgs.].

*Primary Examiner* — Syed O Hasan
(74) *Attorney, Agent, or Firm* — Quarles & Brady LLP

(57) ABSTRACT

The present disclosure provides an air intake system for a power machine that can use a hollow section of a frame of the power machine to form part of an air intake path. The air intake system can include an air inlet coupled to an exterior panel of the power machine, a filter assembly including a filter enclosure and a filter element, a first air conduit coupled between the inlet and an enclosed compartment of a frame of the power machine, and a second air conduit coupled between the enclosed compartment and the filter enclosure. To reach the filter enclosure, the air entering the filter enclosure can travel along an air intake path that includes the air inlet, the first air conduit, the enclosed compartment, and the second air conduit.

17 Claims, 12 Drawing Sheets

(56) References Cited

U.S. PATENT DOCUMENTS

2005/0022772 A1* 2/2005 Ishigami ............ F02M 35/1266
                                                    123/184.21
2010/0071978 A1  3/2010 Kisse
2016/0341158 A1* 11/2016 Rosenfeld ............ F02M 35/048

* cited by examiner

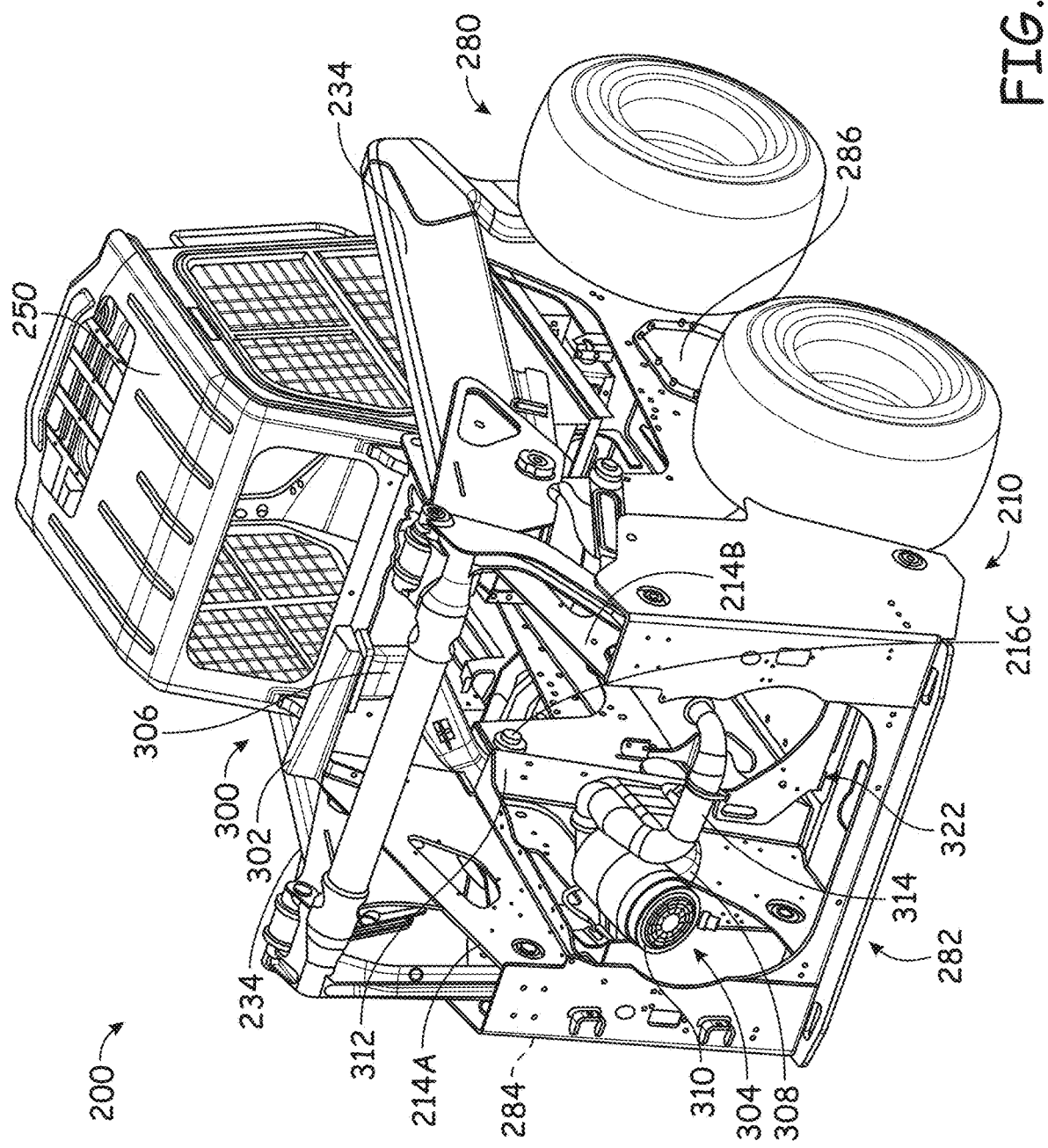

AIR INTAKE SYSTEM FOR POWER MACHINES

CROSS-REFERENCE TO RELATED APPLICATION

This application claims priority to and incorporates by reference U.S. provisional patent application No. 63/402,654, filed Aug. 31, 2022.

BACKGROUND

This disclosure is directed toward power machines. More particularly, this disclosure is directed to air intake systems for an internal combustion engine of a power machine. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders (including mini-loaders), excavators, utility vehicles, mowers, tractors (including compact tractors), and trenchers, to name a few examples.

Power machines that include internal combustion engines include air intake systems. Air intake systems usually include an air intake pipe that directs air flow to a filter element. The air filter element then filters the air entering the engine, whether that be through a compressor inlet on a turbocharger, a throttle body inlet, or an intake manifold/plenum.

The discussion above is merely provided for general background information and is not intended to be used as an aid in determining the scope of the claimed subject matter.

SUMMARY

The present disclosure provides improved air intake systems for power machines, including through the use a hollow section of a frame of a power machine to form part of an air intake path for a power source (e.g., engine) of the power machine. In some examples, a substantially horizontal or a substantially vertical portion of an air intake flow path can be provided, including for intake air inlets forward of an engine (e.g., and also rearward of a cab or other operator station). In some examples, an appropriately configured enclosed compartment of a frame member can facilitate extended horizontal and vertical portions of a flow path.

Some aspects of the disclosure provide a power machine that includes a frame, an engine, and an air intake system for the engine. The frame can include a hollow frame member that forms an enclosed frame compartment with a compartment inlet opening, a compartment outlet opening and an enclosed flow path between the compartment inlet opening and the compartment outlet opening. The engine can be supported by the frame and enclosed in an engine compartment separate from the enclosed frame compartment. The air intake system can include: an air inlet that can be coupled to an exterior panel of the power machine; a filter assembly that can include a filter enclosure and a filter element; a first air conduit that can define a first flow path between the air inlet and the compartment inlet opening; and a second air conduit that can define a second flow path between the compartment outlet opening and the filter enclosure. The air intake system can guide intake air flow to the engine to travel along an air intake path can include the air inlet, the first flow path, the enclosed frame compartment, and the second flow path prior to entering the filter enclosure.

In some examples, the power machine can include a cooling outlet configured to vent air from the engine compartment. The air inlet can be arranged forward of the cooling outlet, relative to a front-to-back axis of the power machine.

In some examples, the air inlet can be arranged rearward of an operator compartment of the power machine, relative to a front-to-back axis of the power machine.

In some examples, the air inlet can be arranged forward of the engine, relative to a front-to-back axis of the power machine.

In some examples, the air inlet, the first flow path, and the enclosed frame compartment can be arranged forward of the engine, relative to the front-to-back axis.

In some examples, the air inlet can include a first inlet opening arranged on a first side of the air inlet facing a front end of the power machine.

In some examples, the air inlet further can include a second inlet opening on a second side of the air inlet facing a lateral side of the power machine.

In some examples, the first air conduit can extend from an inboard side of the air inlet so that the second flow path extends in an outboard direction from the air inlet to the compartment inlet opening.

In some examples, the enclosed frame compartment can include a joint that supports a portion of a lift arm for pivotal movement relative to the frame.

In some examples, the compartment inlet opening can be at a top side of the enclosed frame compartment.

In some examples, the compartment outlet opening can be at a side of the enclosed frame compartment that faces a rear end of the power machine.

In some examples, from a side elevation perspective, the first flow path and the enclosed flow path can define a substantially vertical path for air flow between the air inlet and a bottom end of the enclosed frame compartment.

In some examples, from a top plan perspective, the second flow path can define a path for air flow between the compartment outlet opening and the filter assembly that can be substantially parallel to a front-to-back axis of the power machine.

Some aspects of the disclosure provide an air intake system for a power machine (or included in a power machine). The air intake system can include: an air inlet, a filter assembly, a first air conduit, and a second air conduit. The air inlet can be coupled to an exterior panel of the power machine. The filter assembly can include a filter enclosure and a filter element. The first air conduit can be coupled between the air inlet and an enclosed frame compartment of a frame of the power machine. The second air conduit can be coupled between the enclosed frame compartment and the filter enclosure. The air intake system can guide air flow to the filter assembly to travel along an air intake path that can include, in order, the air inlet, the first air conduit, the enclosed frame compartment, and the second air conduit, prior to entering the filter enclosure.

1 In some examples, the air inlet can include a first opening arranged on a first side of the air inlet facing a front end of the power machine.

In some examples, the air inlet further can include a second opening on a second side of the air inlet facing a lateral side of the power machine.

In some examples, the first air conduit can be coupled to a top side of the enclosed frame compartment.

In some examples, the second air conduit can be coupled to a side of the enclosed frame compartment facing a rear end of the power machine.

In some examples, from a side elevation perspective, the air intake path can define a first air flow path that can be substantially vertical between the air inlet and enclosed frame compartment.

In some examples, from a side elevation perspective, the air intake path can define a second air flow path that can be substantially horizontal between the enclosed frame compartment and a rearward location that can be aligned along a vertical axis with an air inlet of the filter assembly.

Some aspects of the disclosure can provide a method of providing air to an engine of a power machine. Air can be drawn into an air inlet arranged on an exterior of the power machine. The air can be flowed from the air inlet through a first air conduit coupled between the air inlet and a hollow frame member of a frame of the power machine. The air can be flowed from the first air conduit through an enclosed frame compartment of the hollow frame member. The air can be flowed from the enclosed frame compartment through a second air conduit coupled between the enclosed frame compartment and a filter assembly of the engine.

In some examples, the air can be flowed from the air inlet to the hollow frame member along a substantially vertical flow path, relative to a side elevation perspective.

In some examples, the air can be flowed from the hollow frame member toward the engine along a substantially horizontal flow path, relative to the side elevation perspective.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

The following drawings are provided to help illustrate various features of non-limiting examples of the disclosure and are not intended to limit the scope of the disclosure or exclude alternative implementations.

FIG. 5A is a rear perspective view of a representative power machine, in the form of a skid-steer loader, having an air intake system for an engine according to one aspect of the present disclosure and being shown with various parts removed for clarity of presentation.

DETAILED DESCRIPTION

Figure 1:
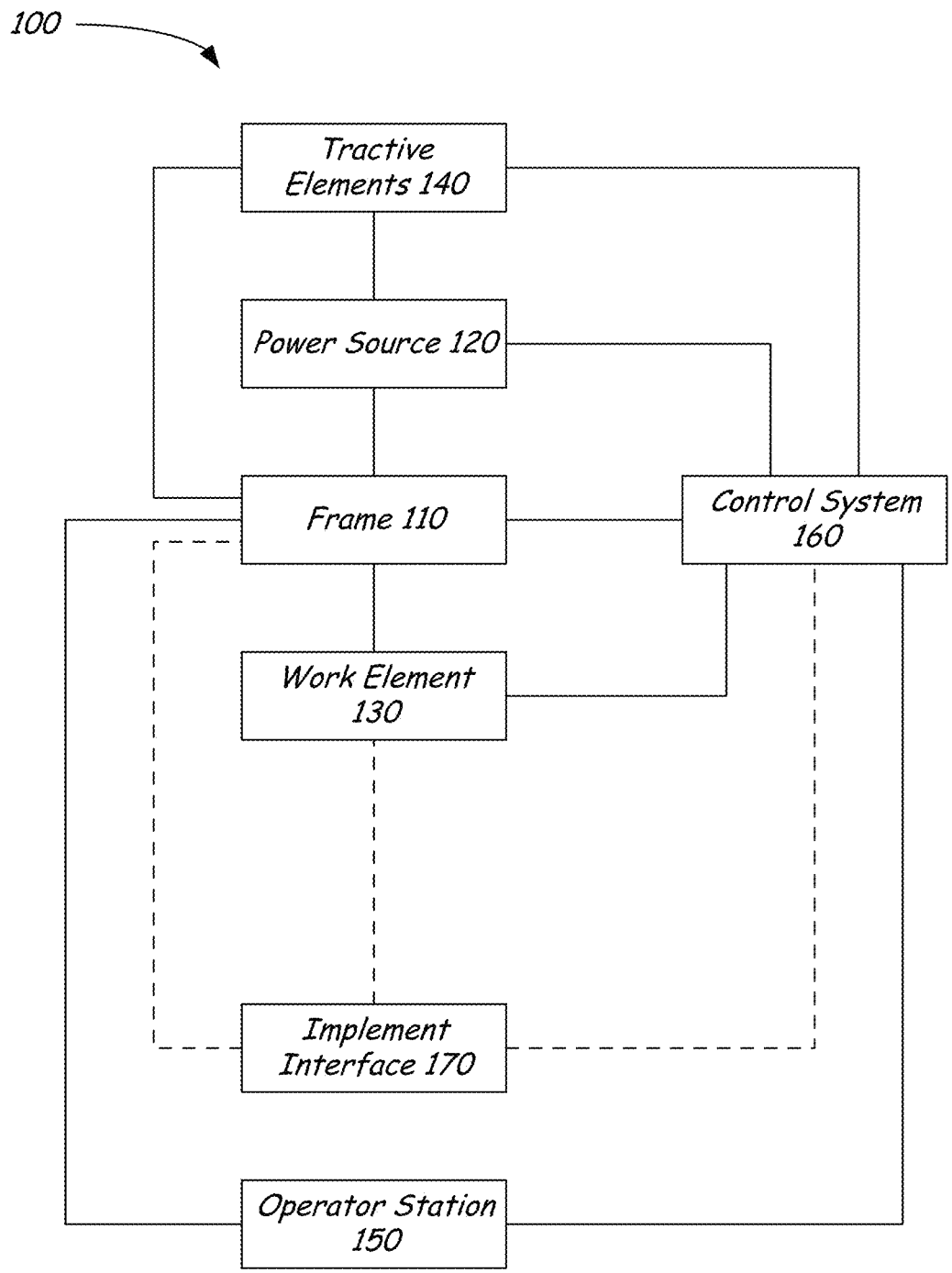
FIG. 1 is a block diagram illustrating functional systems of a representative power machine on which examples of the disclosed technology can be advantageously practiced.

The concepts disclosed in this discussion are described and illustrated by referring to exemplary configurations and implementations. These concepts, however, are not limited in their application to the details of construction and the arrangement of components in the illustrative examples and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

There are various challenges to consider when designing an air intake system for a power machine. These include providing clean air to an engine, and providing cool air to the engine. For example, loaders or other power machines often operate in dusty, dirty environments and some internal compartments, e.g., engine compartments, are not sealed off completely from the outside environment. Further, other air flows for a power machine can introduce unwanted heat and dust to areas surrounding a power machine, from which intake air may conventionally be drawn. For example, a cooling path of a power machine (e.g., the path of air that is drawn in through a radiator and vented to an exterior of the power machine via a cooling fan) contains air that typically has the dirt and dust from the environment entrained therein. The air within the cooling path is also generally hotter than the ambient air temperature due to the air increasing in temperature as it passes over the radiator and is otherwise exposed to heat from the engine compartment.

While heat exchangers and filter elements are typically used to help with some of the challenges noted above, further improvement over conventional air intake systems may be possible. For example, some arrangements disclosed herein can be used to provide improvements in the cleanliness and coolness of air provided at an inlet of the air intake system, and in the efficiency of such an air flow. By ensuring that cooler, cleaner air enters the air intake system, the service life of a filter element and the performance of the engine can be increased, as can the overall efficiency of power systems of the power machine.

For example, some configurations of flow paths and related components for an air intake system can beneficially arrange an inlet of the air intake system to be spaced apart from an engine compartment. Correspondingly, some configurations disclosed herein can provide cooler and cleaner air to an engine of a power machine than can conventional systems. In some cases, an air intake system can include an inlet that is arranged in particular a location that reduces intake of dirt and heat from the environment and from a cooling path of the engine (e.g., a radiator, outlet vent, cooling fan, etc.). For example, flow conduits can be arranged so that an air inlet can be forward of an engine compartment, to be appropriately spaced apart from a rearward outflow of cooling air, or an air inlet can have intake inlets (e.g., screened ports) that face away from an engine compartment.

In some examples, use of a hollow frame member can also allow for improved flow paths for air intake for an engine (or other power source), including by providing appropriately located and enclosed conduits for air flow between an engine compartment and an appropriately spaced intake location. For example, extending a flow path through a frame member can help to provide cooler and cleaner intake air flow than conventional designs and also otherwise improve system efficiency (e.g., via reduced pressure drop for the intake flow path).

In some flow systems disclosed herein (and corresponding cooling methods), inclusion of flow paths through hollow frame members can also assist with regard to packaging and other spatial constraints for interior areas of loaders (e.g., within outer envelopes defined by main frames and exterior or support panels of the loaders). Under conventional approaches, these constraints can make it challenging to design an intake system that can provide optimally efficient flow characteristics. For example, packaging constraints within an engine compartment can be particularly restrictive when trying to avoid designs that have inherent inefficiencies with respect to air flow (e.g., excessively convoluted flow paths). In some cases, a hollow frame member with an enclosed flow path therein can not only itself provide improved flow and spatial efficiency but can also allow other more efficient flow conduits to be used for other portions of an air intake path (e.g., conduits that provide extended sections of substantially horizontal or substantially vertical air flow between an air inlet and an engine).

Figure 2:
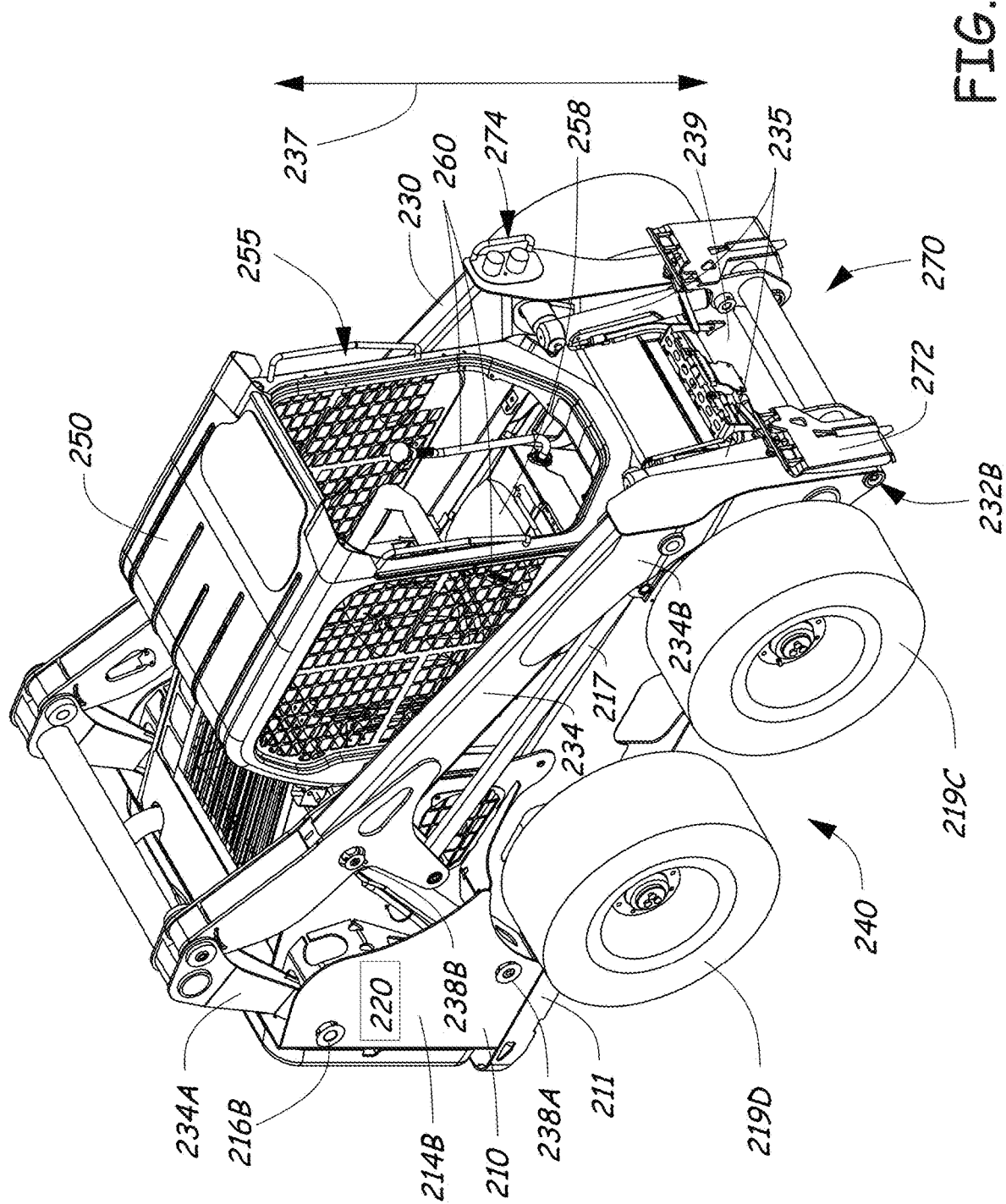
FIGS. 2-3 illustrate perspective views of a representative power machine in the form of a skid-steer loader of the type on which examples the disclosed technology can be practiced.
Figure 3:
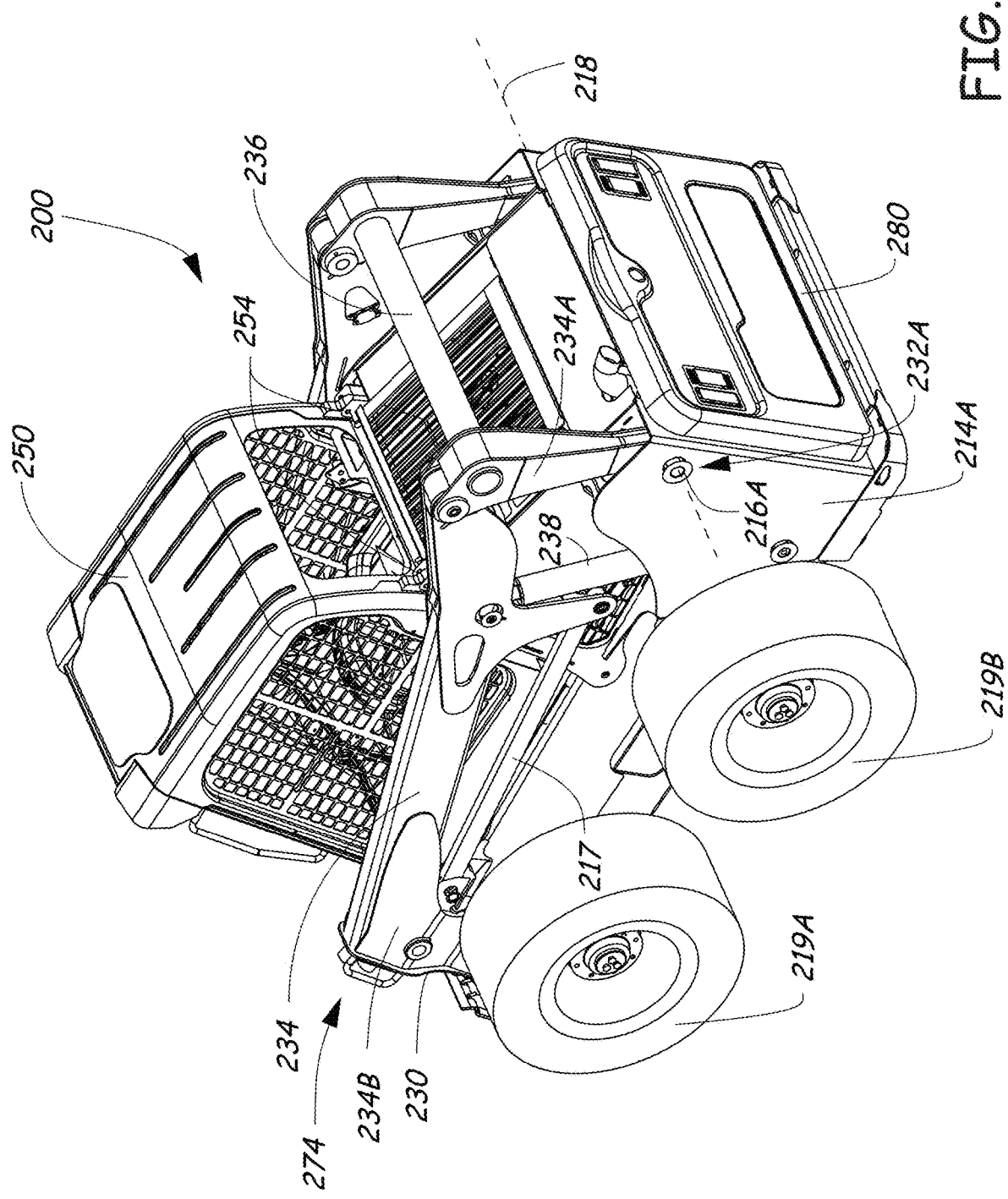

These concepts can be practiced on various power machines, as will be described below. A representative power machine on which the disclosed technology can be practiced is illustrated in diagram form in FIG. 1 and one example of such a power machine is illustrated in FIGS. 2-3 and described below before further examples are disclosed. For the sake of brevity, only one power machine is illustrated and discussed as being a representative power machine. However, as mentioned above, the examples below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the examples discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator. For example, the control system 160 can be an integrated or distributed architecture of one or more processor devices and one or more memories that are collectively configured to receive operator input or other input signals (e.g., sensor data) and to output commands accordingly for power machine operations Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In some examples, as also discussed above, work elements can include lift arm assemblies. In some examples, work elements can include mower decks or other similar equipment. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed technology may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the examples discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some examples disclosed herein can be implemented on a variety of other power machines (e.g., on compact loaders or compact excavators that do not accomplish turns via skid-steer control).

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the examples described below related to track assemblies and mounting elements for mounting the track assemblies to a power machine may be practiced. The loader 200 should not be considered limiting especially as to the description of features that loader 200 may have described herein that are not essential to the disclosed technology and thus may or may not be included in power machines other than loader 200 upon which the examples disclosed below may be advantageously practiced. Unless specifically noted otherwise, examples disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, or mechanical signals. Signals generated in response to operator input devices are provided to various components on the power machine for controlling various functions on the power machine. Among the functions that are controlled via operator input devices on power machine 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include or interacting with the examples discussed below can have various different frame components that support various work elements. The elements of frame 210 discussed herein are provided for illustrative purposes and frame 210 is not the only type of frame that a power machine on which the disclosed technology can be practiced can employ. Frame 210 of loader 200 includes an undercarriage or lower portion 211 of the frame and a mainframe or upper portion 212 of the frame that is supported by the undercarriage. The mainframe 212 of loader 200, in some examples is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which examples of the disclosed technology can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 234 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators or an electronic controller on an implement. The implement power source 274 also exemplarily includes electrical conduits that are in communication with a data bus on the excavator 200 to allow communication between a controller on an implement and electronic devices on the loader 200.

Figure 4:
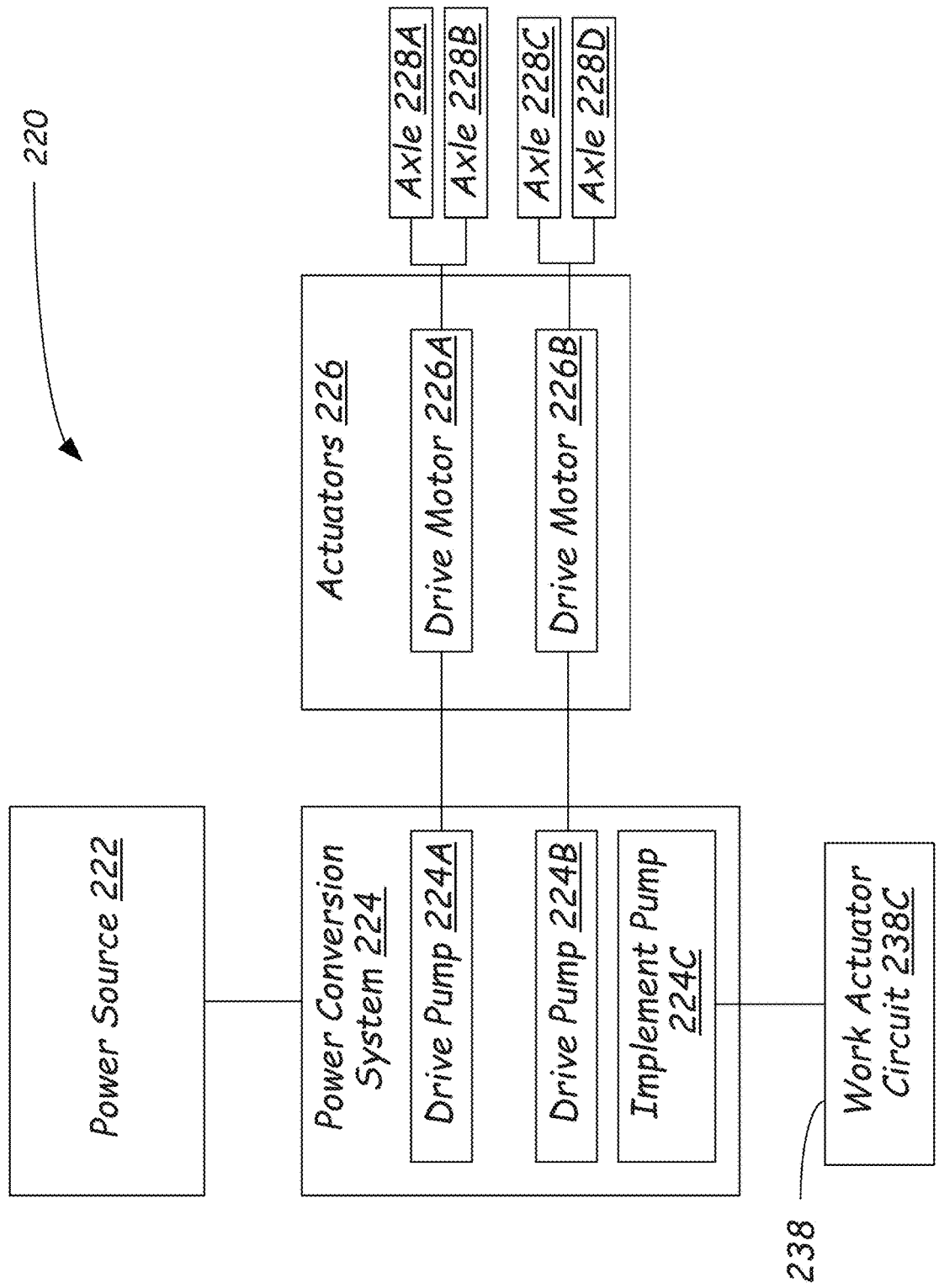
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders or tilt cylinders. In some machines, the work actuator circuit 238C also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the examples discussed below can be practiced. While the examples discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5B:
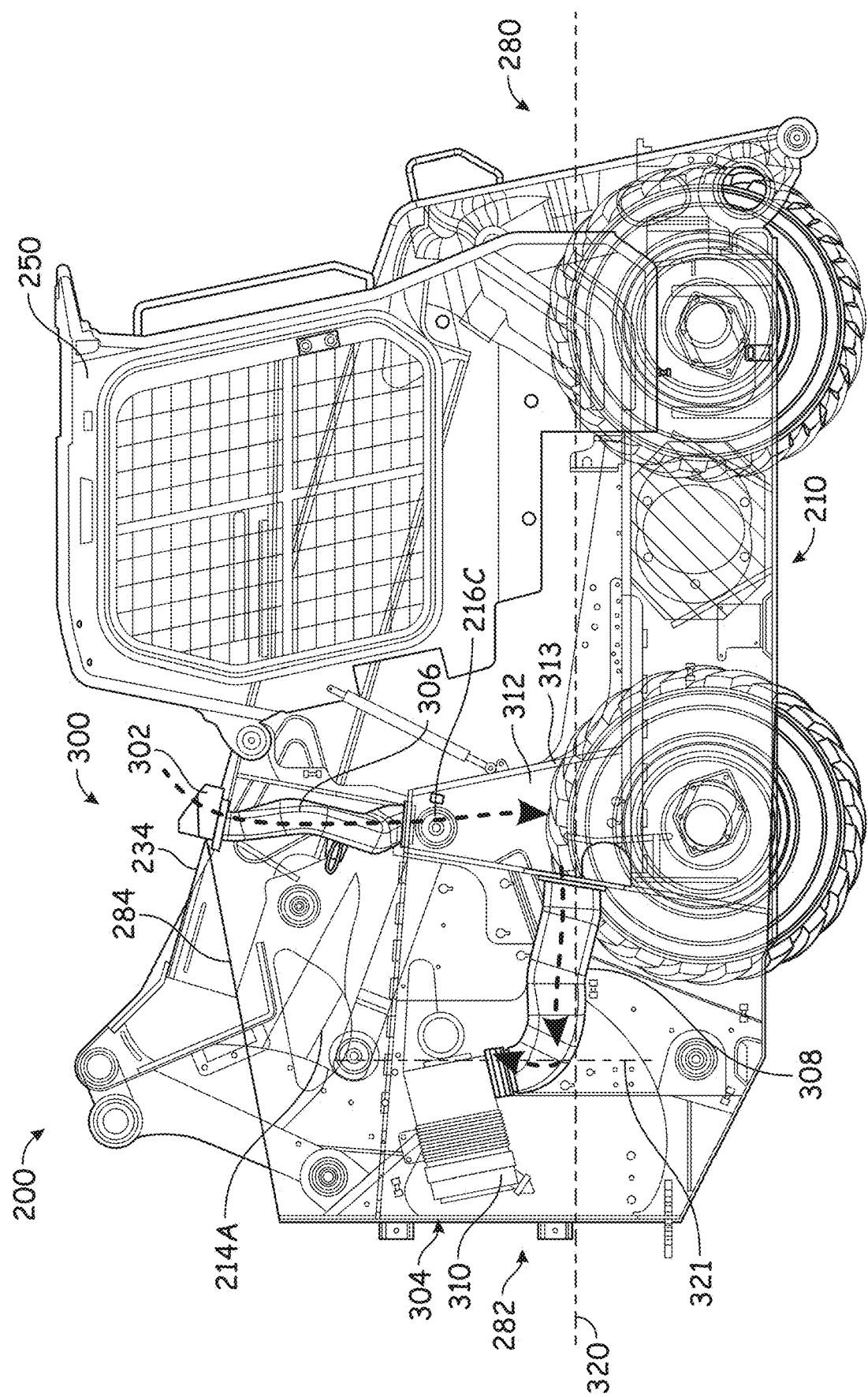
FIG. 5B is a side elevation view of a cross-section of the power machine of FIG. 5A with the engine hidden and certain components rendered transparently for clarity of presentation.

FIGS. 5A and 5B illustrate an air intake system 300 for the power source 220 (e.g., an internal combustion engine) for a particular configuration of the loader 200. As shown in these FIGs., the loader 200 can include a front end 280, a rear end 282 opposite the front end 280, a first lateral side 284 (e.g., a left side), and a second lateral side 286 (e.g., a right side) opposite the first lateral side 284. In the illustrated example, the cab 250 and operator station 255 (see FIGS. 7A and 7B) are arranged at the front end 280 of the loader 200 and the power source 220 is arranged at the rear end 282 of the loader 200. In other examples, other configurations of cabs/operator stations and power sources are possible. For example, an operator station can be arranged at a rear end of a loader and a power source can be arranged at the front end, or between the front end and rear end.

The air intake system 300 is configured to provide air from an exterior of the loader 200 to the power source 220. The air intake system includes an air inlet 302, a filter assembly 304, a first air conduit 306, a second air conduit 308. The filter assembly 304 can include a filter enclosure 310 and a filter element (not separately numbered).

Figure 7A:
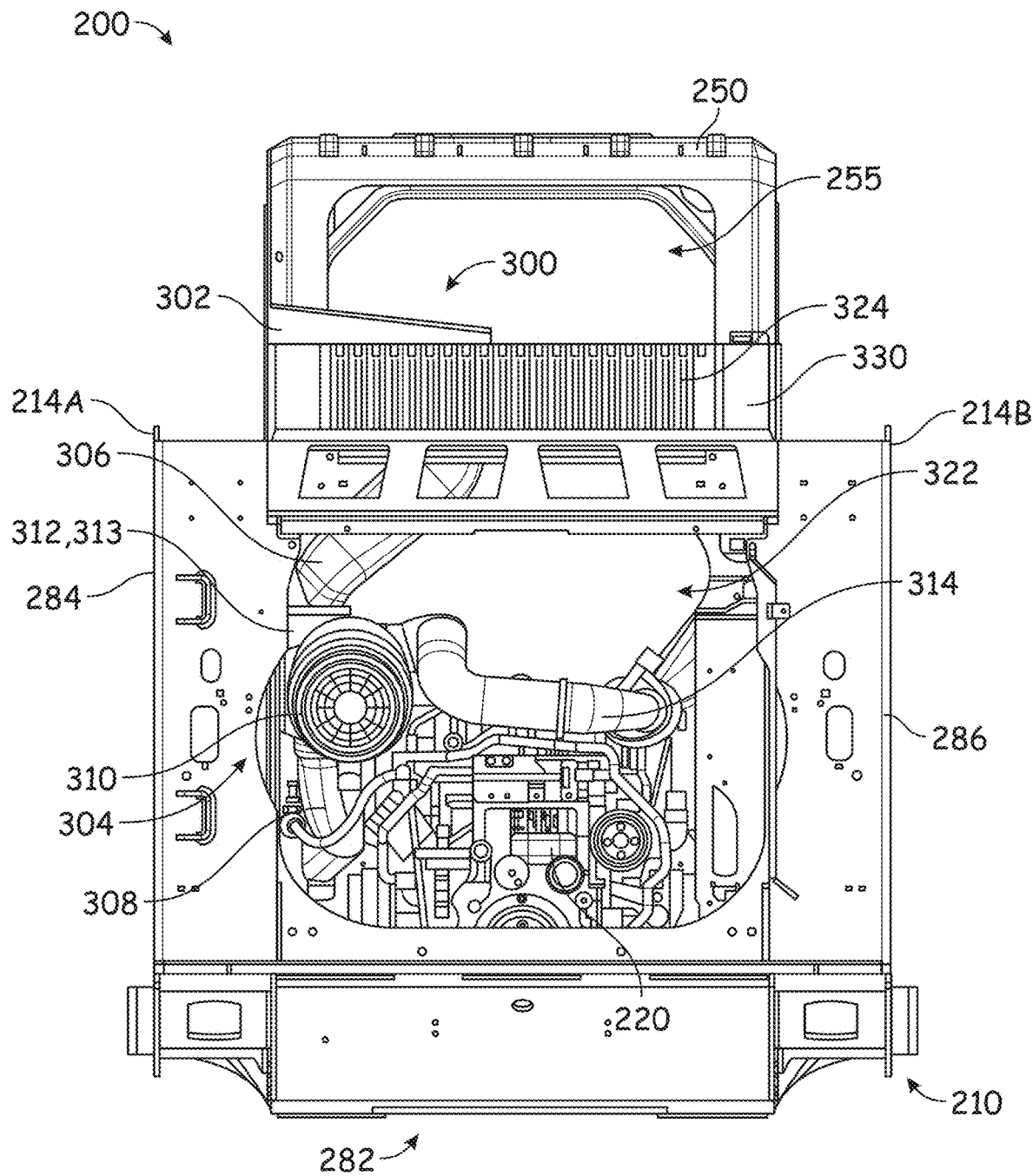
FIG. 7A is a rear profile view of the power machine of FIG. 5A, with a cab and certain other components shown.

The air inlet 302 can include a protruding (or other) housing that is coupled to an exterior panel 330 of the loader 200 (see FIG. 7A). The air inlet 302 is shown as a proud, angled housing formed separately from the exterior panel 330, although some air inlets can be integrally formed with exterior panels of a power machine or can exhibit other geometry.

Figure 6:
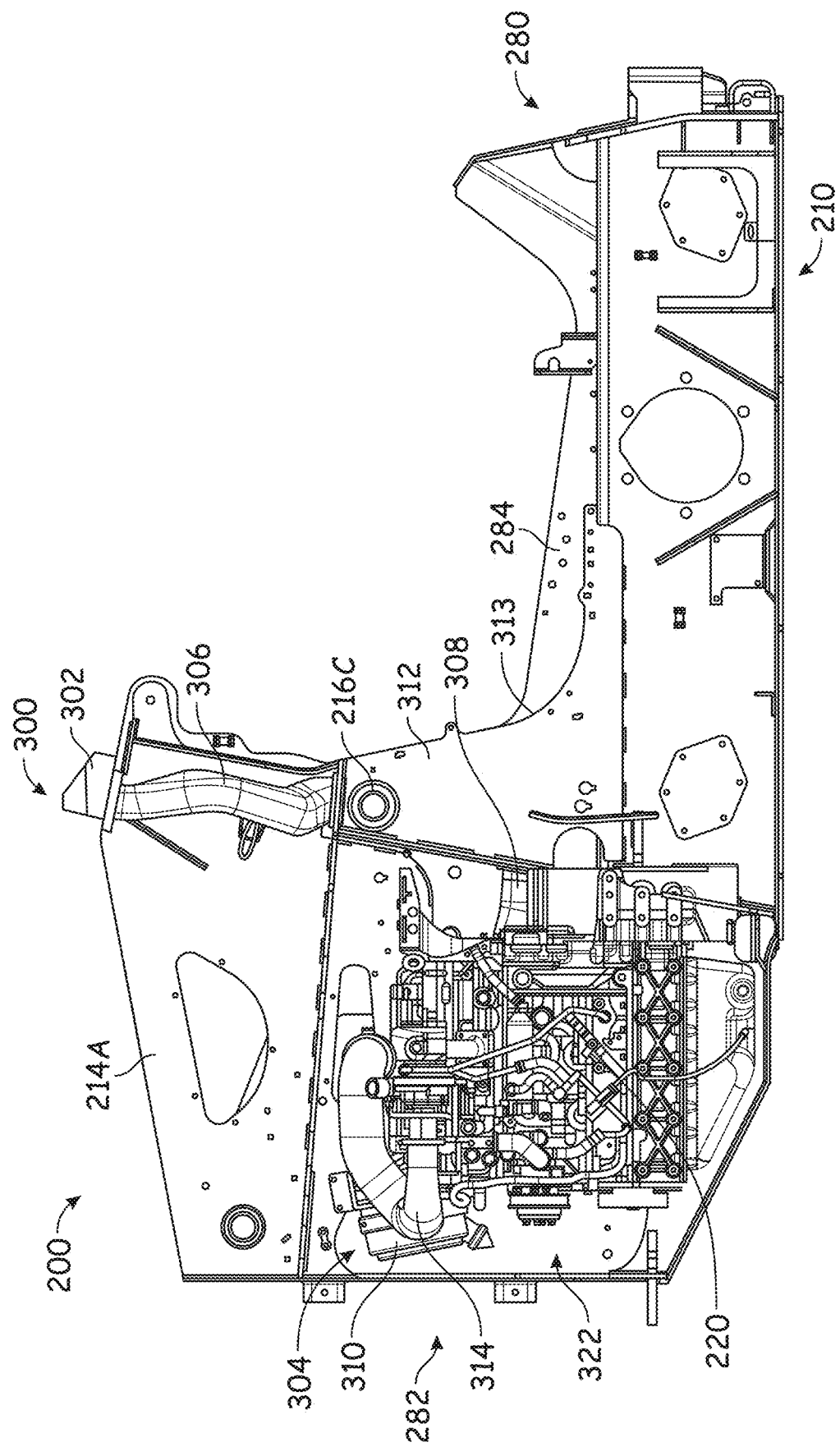
FIG. 6 is a side elevation view of the cross-section of the power machine of FIG. 5A with the engine shown.

The first air conduit 306 can be coupled between the air inlet and an enclosed compartment 312 of the frame 210 of the loader. Thus, the conduit 306 can define a first (upstream) flow path through the first air conduit 306 between an outlet of the air inlet 302 and an inlet of the enclosed compartment 312 (e.g., at the top side of the enclosed compartment 312 as shown in FIG. 6). The second air conduit 308 can be coupled between the enclosed compartment 312 and the filter enclosure 310. Thus, the conduit 306 can define a second (downstream) flow path through the second air conduit 308 between an outlet of the enclosed compartment 312 and an inlet of the filter enclosure 310 (e.g., at the rear side of the bottom end of the enclosure 310 as shown in FIG. 6).

Although the illustrate configuration can provide certain advantages, including as discussed below, other relative locations of components along an intake flow path are also possible. For example, a filter enclosure may be differently located, with corresponding changes to a flow path between an outlet of an enclosed frame compartment and, ultimately, an engine or other power source.

According to the illustrated example, the air intake system 300 can further include a third air conduit 314 (see FIG. 5A) coupled between the filter enclosure 310 and an inlet of the power source 220 (e.g., a turbo inlet, a throttle body, or an intake manifold). In other examples, the filter enclosure 310 can be directly coupled to the inlet of the power source 220.

Accordingly, during operation, air entering the power source 220 is guided by the various noted structures to travel along an air intake path defined by the air inlet 302, the first air conduit 306, the enclosed compartment 312, and the second air conduit 308, prior to entering the filter enclosure 310. From the filter enclosure 310, air can then continue through the conduit 314 (if included) to the power source 220

Figure 5C:
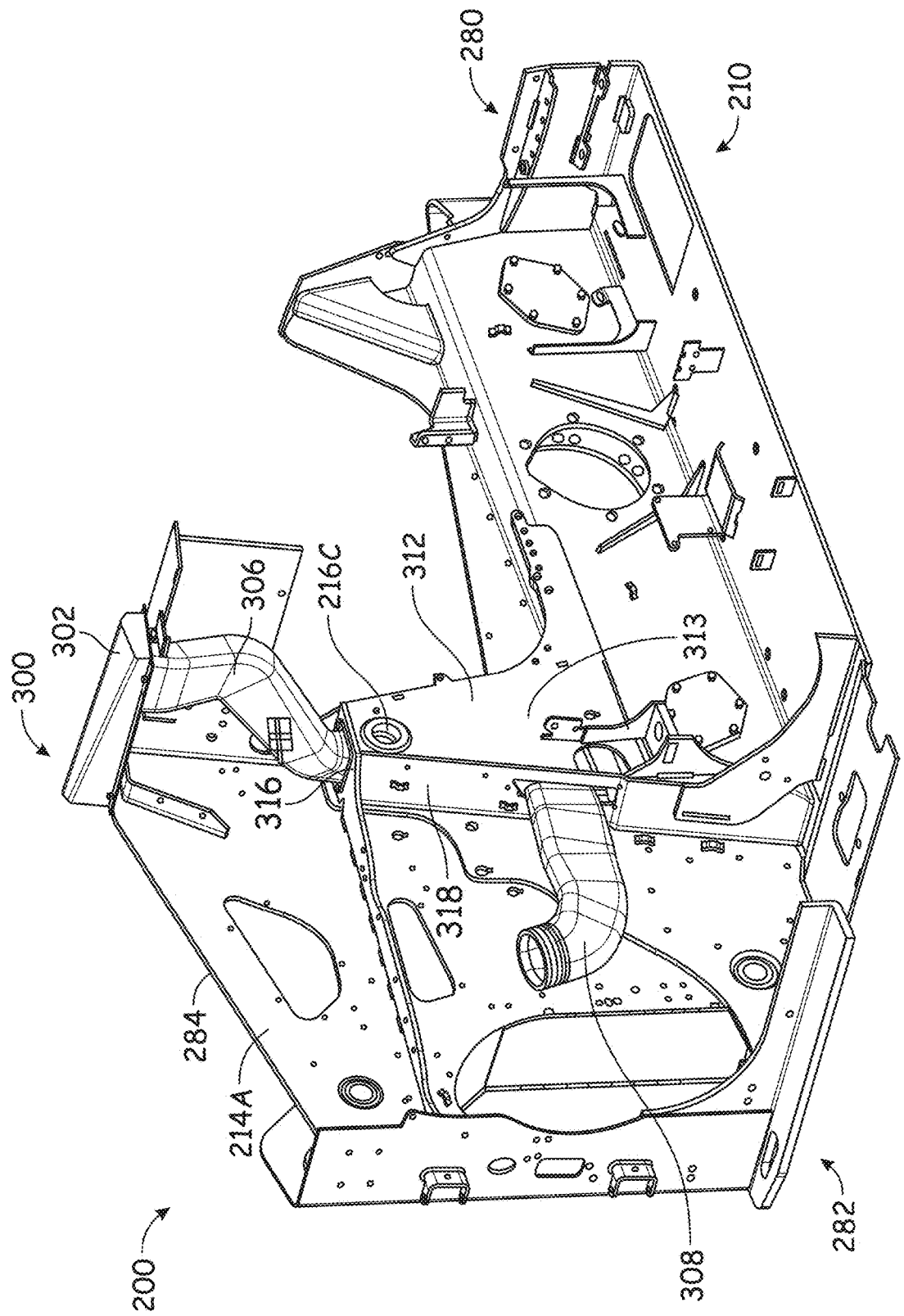
FIG. 5C is a rear perspective view of the cross-section of the power machine of FIG. 5B, with various parts removed for clarity of presentation.

Referring now to FIG. 5C, the enclosed compartment 312 of the frame 210 is formed by a hollow frame member 313 of the frame 210, such that air passing through the air intake system enters the enclosed compartment 312 from the first air conduit 306 and exits the enclosed compartment 312 to the second air conduit 308. Therefore, the enclosed compartment 312 of the frame 210 provides a conduit for air flow between the air inlet 302 and the power source 220. In the illustrated example, the frame member 313 forms a vertically extending structure configured to support the lift arm structure 230 (see FIG. 2) for pivotal movement relative to the power machine frame 210. In particular, the enclosed compartment 312 may be intersected by, or the frame member 313 may otherwise include, a joint 216C configured to provide a pivot point for a link arm of the lift arm structure 230. This combined usage for the compartment 312 (including the surrounding structure) can provide particularly notable packaging efficiencies, in some cases.

The enclosed compartment 312 can form a boxed-in polygonal shape including a first side 316 (e.g., a side facing the top of the loader 200 or a top side) and a second side 318 (e.g., a side facing the rear end 282 of the loader 200 or a rear side). In the illustrated example, a first opening is included on the first side 316 configured to receive air flow from the first air conduit 306 that is also coupled to the first side 316. Similarly, a second opening is included on the second side 318 configured to provide air flow from the enclosed compartment 312 to the second air conduit 308 that is also coupled to the second side 318.

An enclosed compartment can generally include sufficient bounding structure so that substantially all (e.g., 95% or more) of the air that flows into the compartment via an intake flow path also flows out of the compartment via the intake flow path. In the illustrated example, additional openings are present than the inlet and outlet openings for the air intake flow path (e.g., as shown near the conduit 308 in FIG. 5C). However, during assembly of the power machine those openings can be covered with rubber grommets, foam seals, or other sealing devices, such that the enclosed compartment 312 is isolated from an engine compartment 322 that is also defined by the frame 210 to house the power source 220. With such sealing, appropriately configured, hot and dirty air within the engine compartment 322 is generally inhibited from making its way into the enclosed compartment 312 in the frame 210.

In this regard, the enclosed compartment 312 can include formed holes, channels, gaps in weld seams, or other openings to allow passage of communication or power signals, or to allow water within the enclosed compartment 312 to drain (e.g., water from condensation within the compartment 312). Correspondingly, the enclosed compartment 312 may not be perfectly sealed, but may nonetheless be constructed to remain isolated from the engine compartment 322 along an operational flow path for engine air intake, cooling, exhaust, etc.). As such, the enclosed compartment 312 can sometimes form a sealed compartment constructed to allow some operational leakage of air that is substantially lower in magnitude that intended operational air flow (e.g., 5-10% or less in flow volume).

As discussed herein, a first compartment is considered isolated from another if the first compartment is mechanically closed against air flow to the second compartment. For example, seals, structural welds, and interfaces of overlapping structures of a compartment can isolate the compartment from another by substantially inhibiting air flow out of the compartment into the other, as compared to operational air flow through operational flow openings (i.e., designed openings in compartment walls for flow along an operational air flow path). In other words, for some examples, the structural form and added interfaces (e.g., seals) of a compartment can ensure that operational air flow from the compartment through designated flow openings substantially exceeds other contemporaneous air flow from the compartment to another particular area (e.g., exceeds flow to another compartment by 85%, 90%, 95%, 98%, 99%, etc.).

With reference to FIG. 6, the inlet 302 can be arranged generally forward of the power source 220 (e.g., forward of a midpoint point of the crankshaft) to assist in providing appropriately cool and clean air. In the illustrated example, the inlet 302 is arranged completely forward of the power source 220, although other locations are possible. For example, the power source 220 can define a length between a pulley at a first end of the crank shaft and a flywheel at a second end of the crankshaft, with the second end of the crankshaft facing the front end 280 of the loader 200. In some examples, relative to such a length, the first air conduit 306 can be beneficially arranged forward of the midpoint of the power source 220.

Figure 7B:
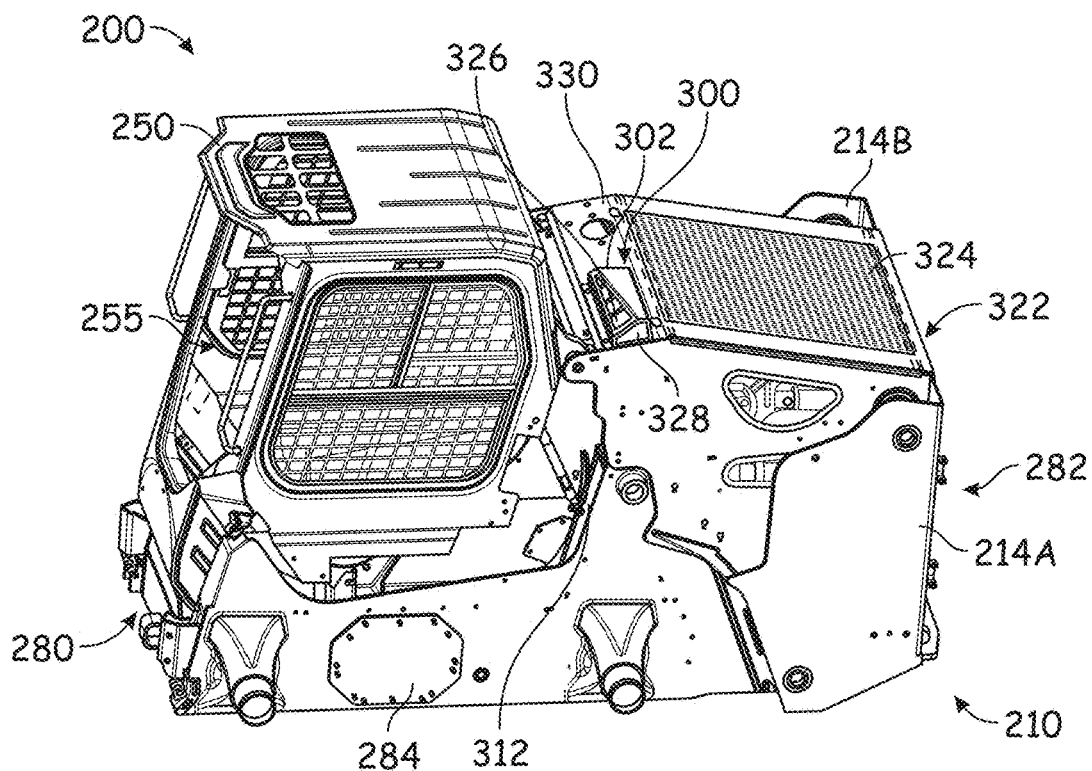
FIG. 7B is a left side perspective view of the power machine of FIG. 5A, with the same components shown as in FIG. 7A.
Figure 7C:
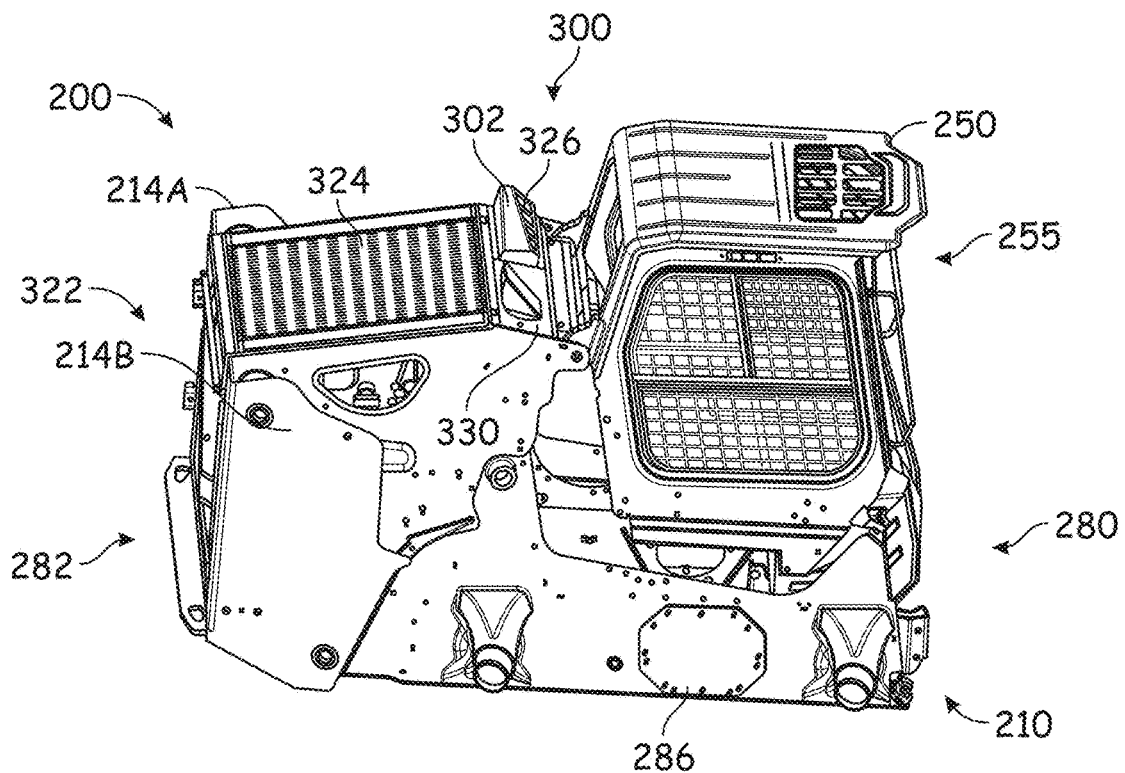
FIG. 7C is a right side perspective view of the power machine of FIG. 5A, with the same components shown as in FIG. 7A.

Referring now to FIGS. 7A-7C, the air inlet 302 of the air intake system 300 can be arranged rearward of the cab 250. In the illustrated example, the air inlet 302 is arranged between the cab 250 and the cooling outlet 324, and, in particular, forward of the cooling outlet 324. The cooling outlet 324 is provided to allow the hot air to escape the engine compartment 322 after the air has passed over the radiator. Accordingly, the air inlet 302 being arranged forward of the cooling outlet 324 allows the air inlet 302 to receive relatively cool air (i.e., the air inlet 302 is configured to draw in cooler ambient air, rather than the hotter air exiting through the cooling outlet 324).

The air inlet 302 can include one or more openings to allow air to enter the air intake system 300. In the illustrated example, as shown in FIGS. 7B and 7C in particular, the air inlet 302 is formed with a hood that includes a first opening 326 arranged on a forward side of the air inlet 302 facing toward the front end 280 of the loader 200 (e.g., facing the cab 250, and facing away from the cooling outlet 324). The air inlet 302 can also include a second opening 328 arranged on a lateral side of the air inlet 302 facing towards the first lateral side 284 of the loader 200. In the illustrated example, the first opening 326 includes a first array of openings (e.g., three screened ports, as shown) along the forward side of the air inlet 302. In some examples, successively larger openings can be provided toward the outboard side of the air inlet 302 (e.g., at further distances outboard from the cooling outlet 324), as can provide improved intake and internal air flow characteristics, including relative to the hotter air from the cooling outlet 324.

In the illustrated example, the hood of the air inlet 302 is closed to air flow (i.e., there are no air intake openings present) on a rear side of the air inlet 302 facing the rear end 282 of the loader 200 (i.e., facing towards the cooling outlet 324 and away from the cab 250). This can also aid in isolating the air inlet 302 from the hot air exiting the cooling outlet 324. In the illustrated example, the hood of the air inlet 302 is also closed to air flow (i.e., there are no openings present) on an opposing lateral side of the air inlet 302 facing the second lateral side 286 of the loader 200 (i.e., facing towards potential stagnation or eddy zones for the cooling outlet 324). This arrangement can also lead to improved quality (e.g., cooler temperature, cleaner composition) of air flow into the air inlet 302.

Inclusion of substantially vertical or substantially horizontal flow paths in select areas of an air intake system can generally help to improve flow efficiency for the system, including by reducing the complexity of the air flow overall and simplifying efforts to keep intake air flow appropriately separated from hotter air flows (e.g., cooling flows) or regions (e.g., engine compartments). In some examples, enclosed flow paths within frame members can provide improved air flow arrangements relative to inclusion of such horizontal or vertical (or otherwise substantially straight-line) flow paths (e.g., in addition to providing improved flow paths for cooler air intake as discussed above). In some cases, such benefits can also accrue for flow paths that are substantially horizontal or vertical from a particular perspective (e.g., a side elevation view), but may deviate from horizontal or vertical from another perspective (e.g., a top plan view, or a rear elevation view) As one example, as shown from a side elevation perspective in FIG. 5B in particular, a flow path along the first air conduit 306 between the air inlet 302 and the enclosed frame compartment 312 can be substantially vertical. Similarly, a flow path along the second air conduit 308 from the enclosed compartment 312 toward the engine can be substantially horizontal.

Figure 5D:
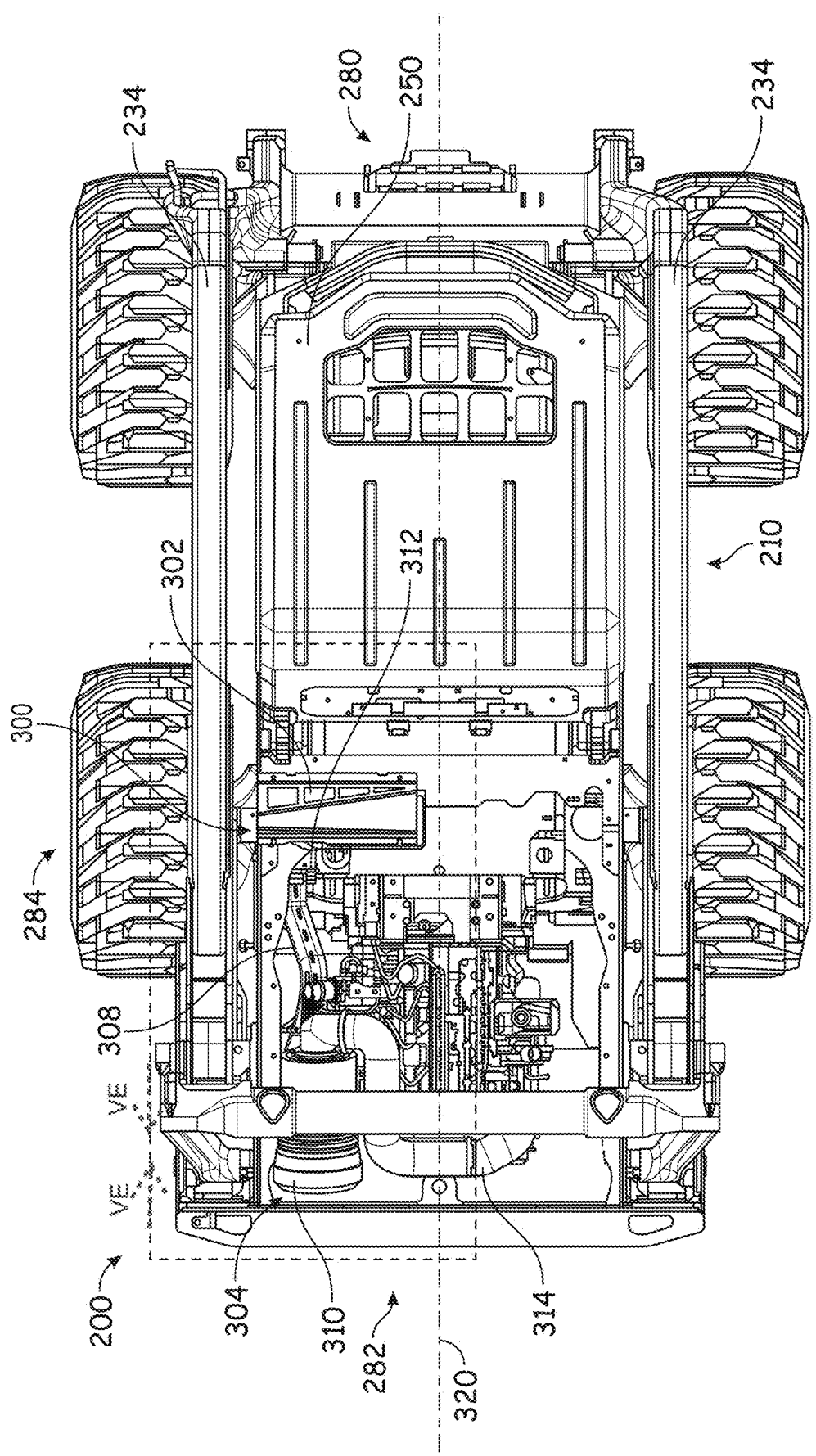
FIG. 5D is a top plan view of the power machine of FIG. 5A.
Figure 5E:
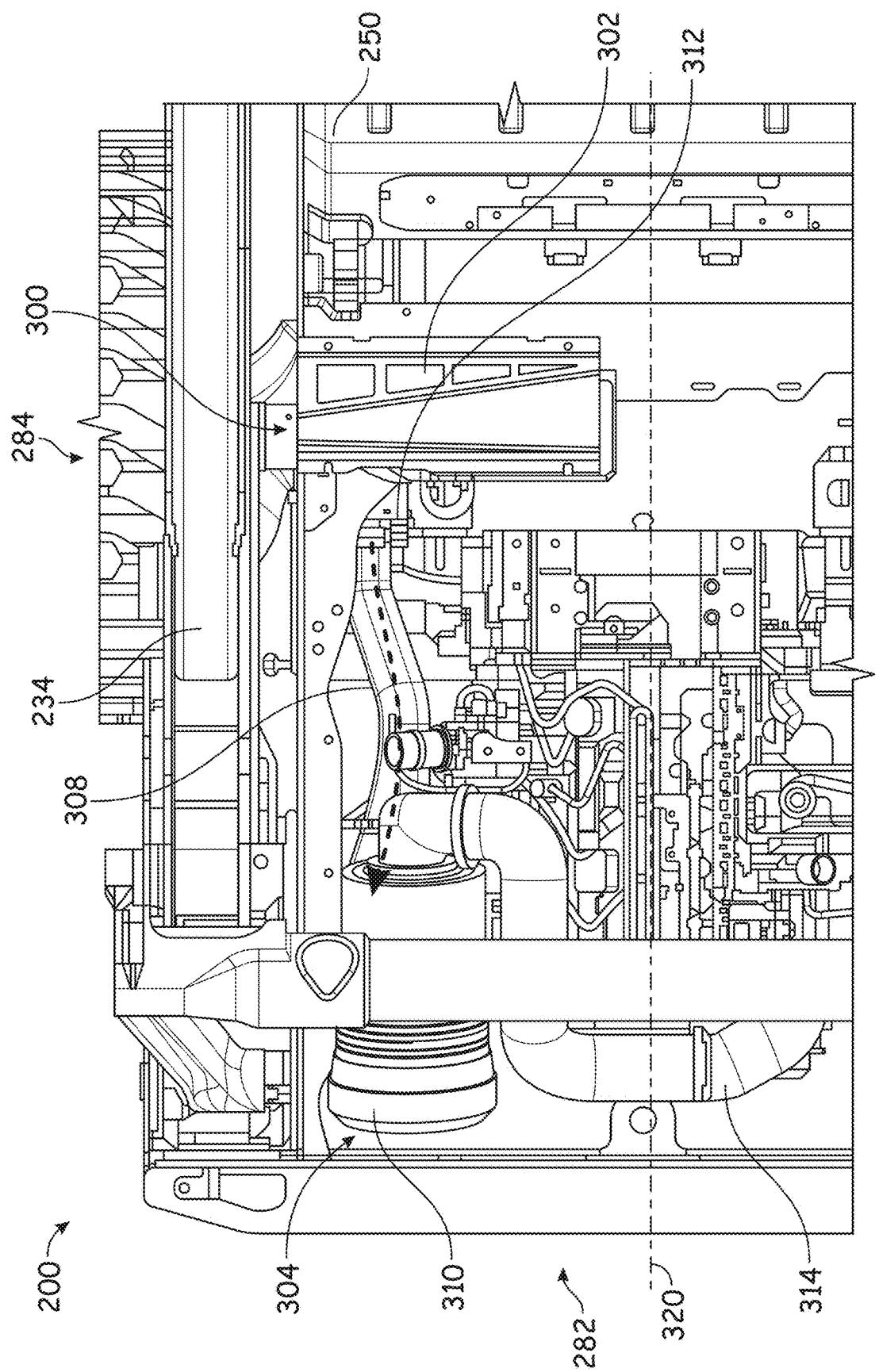
FIG. 5E is a top plan detail view of a portion of the power machine as indicated by dashed area VE-VE in FIG. 5D.

Indeed, in the illustrated example (from the side elevation perspective), an extended-length substantially vertical flow path is provided between the air inlet and the bottom portion of the frame compartment 312 (i.e., as shown, the portion from within which the frame air outlet directs air flow into the substantially horizontal flow path of the first air conduit 306). Further, in part also due to the configuration of the frame compartment 312, the second air conduit 308 can define a substantially horizontal flow path from the frame compartment over relatively large distances (e.g., more than a majority of the length of the conduit 308). For example, as illustrated in FIG. 5B, the second air conduit 308 can define a substantially horizontal flow path from the frame compartment 312 to a rear portion of the engine 322, in alignment with an inlet of the filter assembly 304 along a vertical reference line 321. Thus, the extended length of this substantially horizontal flow path can also allow for the inclusion of another substantially vertical flow path, extending upward to the filter assembly 304. Further, as illustrated in FIGS. 5D and 5E (from a top plan perspective), a flow path along the second air conduit 308 defines a path for operational air flow, between the frame compartment 312 (e.g., from a compartment outlet opening) and the filter assembly 304, that is substantially parallel to a front-to-back axis (e.g., centerline 320) of the power machine.

Although the presently disclosed technology has been described by referring preferred implementations, workers skilled in the art will recognize that changes may be made in form and detail without departing from the scope of the discussion.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a power machine, as defined relative to a horizontal support surface on which the power machine is operationally situated), with similar derived meaning also for "substantially horizontal." For a path that is not linear, the path can be considered to be substantially parallel to a reference direction if a straight line between end-points of the path is substantially parallel to the reference direction or a mean derivative (i.e., mean local slope) of the path within a common reference frame as the reference direction is substantially parallel to the reference direction.

Also as used herein, unless otherwise limited or defined, "substantially perpendicular" indicates a direction that is within ±12 degrees of perpendicular a reference direction (e.g., within ±6 degrees), inclusive. For a path that is not linear, the path can be considered to be substantially perpendicular to a reference direction if a straight line between end-points of the path is substantially perpendicular to the reference direction or a mean derivative (i.e., mean local slope) of the path within a common reference frame as the reference direction is substantially perpendicular to the reference direction.

Also as used herein in the context of a power machine, unless otherwise defined or limited, the term "lateral" refers to a direction that extends at least partly to a left or a right side of a front-to-back reference line defined by the power machine (e.g., centerline 320 of FIG. 5C). Accordingly, for example, a lateral side wall of a cab of a power machine can be a left side wall or a right side wall of the cab, relative to a frame of reference of an operator who is within the cab or is otherwise oriented to operatively engage with controls of an operator station of the cab. Similarly, a "centerline" (e.g., centerline 320 of FIG. 5C) of a power machine refers to a reference line that extends in a front-to-back direction of a power machine, approximately half-way between opposing lateral sides of an outer spatial envelope of the power machine. Also as used herein, the terms "about" and "approximately" mean plus or minus 5% of the number that each term precedes, unless otherwise specified.

Also as used herein, unless otherwise defined or limited, the terms "inboard" and "outboard" refer to a relative relationship (e.g., a lateral distance) between one or more objects or structures and a centerline of the power machine, along a lateral side of the power machine. For example, a first structure that is inboard of a second structure is positioned laterally inward from the second structure so that a distance between the first structure and the centerline of the power machine is less than a distance between the second structure and the centerline of the power machine. Conversely, a first structure that is outboard of second structure is positioned laterally outward from the second structure so that a distance between the first structure and the centerline of the power machine is greater than a distance between the second structure and the centerline of the power machine.

Similarly, as used herein, unless otherwise defined or limited, the terms "interior" and "exterior" refers to a relative relationship (e.g., a lateral distance) between one or more structures (e.g., a sub-structure) and a centerline of a reference structure (e.g., a main structure) that extends in a front-to-back direction or between first and second ends of the reference structure. For example, an interior structure is disposed closer to a centerline of a reference structure than an exterior structure. In this regard, an outboard structure of a subassembly of a power machine may also be an exterior structure. In contrast, an exterior structure of a subassembly, relative to a centerline of the subassembly, may not necessarily be outboard of other components of the subassembly.

In some implementations, devices or systems disclosed herein can be utilized, manufactured, installed, etc. using methods embodying aspects of the disclosed technology. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as examples of the disclosed technology, of the utilized features and implemented capabilities of such device or system.

We claim:

1. A power machine, comprising:
a frame including a hollow frame member that forms an enclosed frame compartment with a compartment inlet opening, a compartment outlet opening, an enclosed flow path between the compartment inlet opening and the compartment outlet opening, and a joint;
a lift arm movably secured to the frame and supported at the joint of the enclosed frame compartment for pivotal movement relative to the frame;

an engine supported by the frame and enclosed in an engine compartment separate from the enclosed frame compartment; and an air intake system for the engine, the air intake system comprising:
  an air inlet coupled to an exterior panel of the power machine;
  a filter assembly including a filter enclosure and a filter element;
  a first air conduit defining a first flow path between the air inlet and the compartment inlet opening, the first flow path defining a substantially vertical path for air flow between the air inlet and a bottom end of the enclosed frame compartment, from a side elevation perspective; and
  a second air conduit defining a second flow path between the compartment outlet opening and the filter enclosure, the second flow path defining a path for air flow between the compartment outlet opening and the filter assembly that is substantially parallel to a front-to-back axis of the power machine, from a top plan perspective;
  wherein the air intake system guides intake air flow to the engine to travel along an air intake path including the air inlet, the first flow path, the enclosed frame compartment, and the second flow path prior to entering the filter enclosure.

2. The power machine of claim 1, wherein the power machine includes a cooling outlet configured to vent air from the engine compartment; and
  wherein the air inlet is arranged forward of the cooling outlet, relative to the front-to-back axis of the power machine.

3. The power machine of claim 1, further comprising:
an operator compartment;
  wherein the air inlet is arranged rearward of the operator compartment, relative to the front-to-back axis of the power machine.

4. The power machine of claim 1, wherein the air inlet is arranged forward of the engine, relative to the front-to-back axis of the power machine.

5. The power machine of claim 4, wherein the air inlet, the first flow path, and the enclosed frame compartment are arranged forward of the engine, relative to the front-to-back axis.

6. The power machine of claim 1, wherein the air inlet includes a first inlet opening arranged on a first side of the air inlet facing a front end of the power machine.

7. The power machine of claim 6, wherein the air inlet further includes a second inlet opening on a second side of the air inlet facing a lateral side of the power machine.

8. The power machine of claim 7, wherein the first air conduit extends from an inboard side of the air inlet so that the second flow path extends in an outboard direction from the air inlet to the compartment inlet opening.

9. The power machine of claim 1, wherein the compartment inlet opening is at a top side of the enclosed frame compartment.

10. The power machine of claim 9, wherein the compartment outlet opening is at a side of the enclosed frame compartment that faces a rear end of the power machine.

11. An air intake system for a power machine, comprising:
an air inlet coupled to an exterior panel of the power machine;
a filter assembly including a filter enclosure and a filter element;
a first air conduit coupled, and extending downwardly, between the air inlet and a top of an enclosed frame compartment of a frame of the power machine, the enclosed frame compartment supported on the frame and isolated from an engine compartment that is defined by the frame rearward of the enclosed frame compartment; and
a second air conduit coupled, and extending rearwardly, between a side of the enclosed frame compartment and the filter enclosure;
wherein the air intake system guides air flow to the filter assembly to travel along an air intake path that includes, in order, the air inlet, the first air conduit, the enclosed frame compartment, and the second air conduit, prior to entering the filter enclosure, and wherein the first air conduit extends in a substantially vertical direction relative to the power machine and the second air conduit extends in a substantially horizontal direction relative to the power machine.

12. The air intake system of claim 11, wherein the air inlet includes a first opening arranged on a first side of the air inlet facing a front end of the power machine.

13. The air intake system of claim 12, wherein the air inlet further includes a second opening on a second side of the air inlet facing a lateral side of the power machine.

14. The air intake system of claim 11, wherein the side of the enclosed frame compartment faces a rear end of the power machine.

15. The air intake system of claim 14, wherein, from a side elevation perspective, one or more of:
  the air intake path defines a first air flow path that is substantially vertical between the air inlet and the enclosed frame compartment; or
  the air intake path defines a second air flow path that is substantially horizontal between the enclosed frame compartment and a rearward location that is aligned along a vertical axis with an air inlet of the filter assembly.

16. A method of providing air to an engine of a power machine, the method comprising:
  drawing air into an air inlet arranged on an exterior of the power machine;
  flowing the air from the air inlet downwardly through a first air conduit coupled between the air inlet and a hollow frame member of a frame of the power machine;
  flowing the air from the first air conduit downwardly through an enclosed frame compartment of the hollow frame member; and
  flowing the air from the enclosed frame compartment through a second air conduit coupled between the enclosed frame compartment and an engine compartment that supports the engine at a rear end of the power machine, in alignment with a filter assembly of the engine, such that the air flows toward the rear end of the power machine and away from an operator station of the power machine, flowing the air from the air inlet to the hollow frame member along a substantially vertical flow path, relative to a side elevation perspective; and
  flowing the air from the hollow frame member toward the engine along a substantially horizontal flow path, relative to the side elevation perspective.

17. The air intake system of the claim 11, wherein the enclosed frame compartment includes a joint for supporting a lift arm of the power machine.

* * * * *